United States Patent [19]

Tajima et al.

[11] Patent Number: 4,649,071

[45] Date of Patent: Mar. 10, 1987

[54] COMPOSITE MATERIAL AND PROCESS FOR PRODUCING THE SAME

[75] Inventors: Ichiro Tajima, Nagoya; Minoru Yamamoto, Aichi, both of Japan

[73] Assignee: Kabushiki Kaisha Toyota Chuo Kenkyusho, Aichi, Japan

[21] Appl. No.: 728,698

[22] Filed: Apr. 29, 1985

[30] Foreign Application Priority Data

Apr. 28, 1984 [JP] Japan .................................. 59-87116
May 14, 1984 [JP] Japan .................................. 59-96143

[51] Int. Cl.⁴ ............................ B32B 7/02; B05D 3/06

[52] U.S. Cl. ....................................... 428/212; 427/38; 428/409; 428/421; 428/422; 428/429; 428/451

[58] Field of Search ............... 428/212, 429, 187, 409, 428/421, 422, 451; 427/38

[56] References Cited

U.S. PATENT DOCUMENTS 4,517,238 5/1985 Mine et al. .......................... 428/212
4,545,646 10/1985 Chern et al. ........................ 428/187

*Primary Examiner*—Thomas J. Herbert
*Attorney, Agent, or Firm*—Parkhurst & Oliff

[57] ABSTRACT

A composite material comprising a substrate and a single or multiple surface layer formed thereon is disclosed. The surface layer has a structure in which the side in contact with the substrate contains a comparatively large amount of an adhesive component which bonds the surface layer to the substrate and the side opposite to the substrate contains a comparatively large amount of a protective component having characteristic chemical and physical properties. The amounts of the two components vary continuously across the thickness of the surface layer. The surface layer is formed by plasma polymerization.

27 Claims, 9 Drawing Figures

COMPOSITE MATERIAL AND PROCESS FOR PRODUCING THE SAME

BACKGROUND OF THE INVENTION

1. Field of the Invention

The present invention relates to a composite material and a method for producing the same. The composite material of the present invention is improved in surface physical and chemical properties such as water repellency, wettability, adhesion, mechanical durability, and transparency. The composite material of the present invention is useful for water-repellent glass and surface-modified plastics such as those used in building interiors, automobiles, vehicles, aircraft, ships, optical instruments (e.g., cameras), and household and office appliances.

2. Description of the Prior Art

Heretofore, an organic silicon compound having a siloxane bond has been generally used as a water repellent for glass. In practice, a film of siloxane polymer (or silicone) is formed on a glass surface by treating the glass surface with a monomer gass of alkylhalosilane followed by hydrolysis, or by applying a solution of polydimethylsiloxane to the glass surface followed by heating and drying. The water repellent glass produced by these conventional methods are disadvantageous in that the silicone film has poor adhesion to the glass surface so that it is easily peeled off the glass in the peel test with an adhesive tape.

In addition, the above-mentioned methods involve some problems. The first method involves the generation of a harmful hydrogen halide gas and the second method causes the strength of the treated glass to decrease due to heating and requires a time-consuming step of removing solvent from the water repellent film.

There are also some problems with general-purpose plastics such as polyethylene, polystyrene, polycarbonate, and polymethyl methacrylate which are used for building interiors and vehicles owing to lightness, ease of fabrication, and low price. Specifically, many plastics are attacked by organic solvents, degraded by light, ozone, and rain, and are easily scratched due to low surface hardness. Transparent plastics which are used for optical instruments (e.g., glasses, cameras, and lenses), windows, doors, cups, and showcases suffer the same problems as well.

For the solution of these various problems, many attempts have been made to coat the surface of plastics with a fluoroplastic resin or silicone resin which is superior in chemical resistance and weather resistance. Unfortunately, the protective coatings of these resins have poor adhesion to other plastics due to their low polarity and surface wettability. Thus they are easily peeled off when subjected to a great peel force. In addition, the weak adhesion of these resins to other plastics permits water and foreign materials to enter the interface between the plastics surface and the protective coating thereon, which leads to the separation of the protective coatings.

There are methods other than those mentioned above for making protective coatings. These methods include a wet process of dipping a plastics molding in a resin solution followed by evaporation of solvent, and a dry process which employs plasma polymerization on the surface of a plastics molding. These processes, however, do not necessarily provide protective coatings having good adhesion.

The present invention provides a protective coating having good adhesion which is formed by a process different from conventional processes such as those disclosed in Japanese Patent Laid-Open Nos. 65575/1977, 7474/1979, and 147431/1983. The processes disclosed in these references are, respectively, a process for forming a protective coating from an organosilicon compound, a process for coating boron trifluoride under the protective coating to improve adhesion, and a process for making an undercoating of an aromatic compound. According to the present invention, a protective coating having good adhesion is produced in a different manner that the above-mentioned conventional methods.

SUMMARY OF THE INVENTION

It is an object of the present invention to provide a composite material having a surface layer which improves the properties of the substrate or protects the substrate, with much improved adhesion between the surface layer and the substrate.

It is another object of the present invention to provide a composite material in the form of water repellent glass having sufficient water repellency and durability and being free of the above-mentioned disadvantages resulting from the production method.

It is still another object of the present invention to provide a composite material in the form of surface-modified plastics which is improved in chemical resistance, weather resistance, wettability, adhesion, and scratch resistance, and can even be transparent in some cases.

The composite material of the present invention is comprised of a substrate such as glass and plastics and a single or multiple surface layer formed on the substrate. The surface layer has a characteristic structure in which the side in contact with the substrate contains a comparatively large amount of adhesive component which bonds the surface layer to the substrate, and the side opposite the substrate contains a comparatively large amount of protective component, said adhesive component being a polymer formed by plasma polymerization and having an adhesive property, and said protective component being a polymer formed by plasma polymerization and having a hydrophobic or hydrophilic property.

In a preferred embodiment of the present invention, the amount of the adhesive component and the amount of the protective component vary continuously across the thickness of the surface layer. In another preferred embodiment of the present invention, the part of the surface layer which is in contact with the substrate is made of the adhesive component and the part of the surface layer which is opposite the substrate is made of the protective component, and the amounts of the two components vary across the thickness of the intermediate part held between the two parts. In further another preferred embodiment, the surface layer consists of two layers, i.e., an adhesion layer composed of the adhesive component which is in contact with the substrate and a protective layer composed of the protective component which is opposite the substrate, and the amounts of the two components vary at a boundary between the two layers.

DETAILED DESCRIPTION OF THE INVENTION

Figure 1:
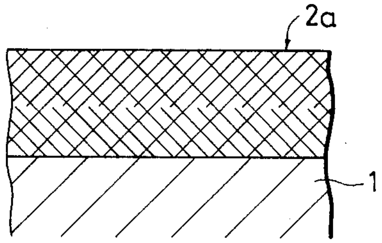
FIG. 1 is a sectional view of a first embodiment of the composite material of the present invention.

The composite material of the present invention comprises a substrate (1) and a surface layer (2*a*) as shown in FIG. 1. The surface layer is formed in such a manner that the amount of the adhesive component continuously decreases across the thickness thereof from the substrate side toward the outer side, and the amout of the protective component increases across the thickness thereof from the substrate side toward the outer side.

Figure 2:
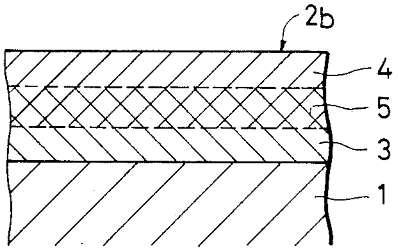
FIG. 2 is a sectional view of a second embodiment of the composite material of the present invention.

In a preferred embodiment of the present invention, the composite material comprises a substrate (1) and a surface layer (2*b*) as shown in FIG. 2. The surface layer is composed of an adhesion layer (3) of the adhesive component, a protective layer (4) of the protective component, and an intermediate layer (5) between the adhesion layer and the protective layer. In this embodiment, the amounts of the two components vary across the thickness of the intermediate layer as shown in FIG. 1.

Figure 3:
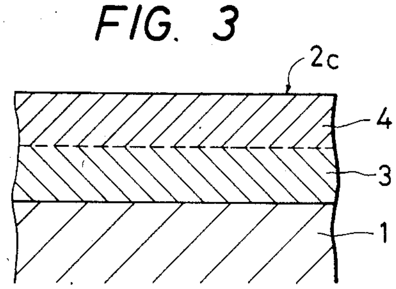
FIG. 3 is a sectional view of a third embodiment of the composite material of the present invention.

In another preferred embodiment of the present invention, the composite material consists of a substrate (1) and a surface layer (2*c*) as shown in FIG. 3, in which the amounts of the two components vary at a boundary between the two layers. The surface layer is composed of an adhesion layer (3) of the adhesive component, and a protective layer (4) of the protective component.

When the composite material of the present invention is water repellent glass, the water repellent film formed on the glass surface is composed mainly of a silicon compound, with the inner side thereof being incorporated with a polymer (adhesive component) which bonds well to glass and the outer side thereof being incorporated with a polymer (water repellent component) which has good water repellency. The surface film of this structure exhibits good water repellence and good adhesion to glass. In a preferred embodiment of this structure, the glass surface is coated with a water repellent film composed of an adhesive component and a protective component. The adhesive component is a polymer of a silicon compound, and the protective component is a polymer of a silicon compound or fluorine compound. The silicon compound of the protective component contains more carbon or less oxygen than the silicon compound of the adhesive component. The water repellent film has a structure in which the amount of the adhesive component is comparatively large in the inner side of the film and the amount of the protective component is comparatively large in the outer side of the film. With these compounds, the surface will have a contact angle to water of not less than 90°.

According to the present invention, the water repellent glass exhibits three preferred embodiments. In the first embodiment, the water repellent film is formed so that the amount of the polymer of the adhesive component continuously decreases and the amount of the polymer of the water repellent component increases across the thickness of the film from the substrate side toward the outer side, as shown in FIG. 1. In the second embodiment, the water repellent film comprises three layers, i.e., an inner layer of the adhesive component, an outer layer of the water repellent component, and an intermediate layer between the inner and outer layers. In the intermediate layer, the amounts of the two components vary continuously across the thickness of the film as mentioned above and as shown in FIG. 2. In the third embodiment, the water repellent film comprises two layers. The first layer is composed of the adhesive component bonded to the glass surface and the second layer is composed of the water repellent component formed thereon and the amounts of the two components vary at a boundary between the two layers, as shown in FIG. 3.

The adhesive component is a polymer of a silicon compound, such as tetramethoxysilane ($Si(OCH_3)_4$) and trimethoxymethylsilane ($CH_3Si(OCH_3)_3$). The water repellent component is a polymer of a silicon compound containing more carbon or less oxygen than the silicon compound of the adhesive component, or a polymer of a fluorine compound. Examples of the former silicon compound include tetraethoxysilane ($Si(OC_2H_5)_4$) and tetrapropoxysilane ($Si(OC_3H_7)_4$) when the adhesive component is tetramethoxysilane. Examples of the latter silicon compound include trimethylmethoxysilane ($(CH_3)_3SiOCH_3$) and dimethyldimethoxysilane ($(CH_3)_2Si(OCH_3)_2$) when the adhesive component is tetramethoxysilane. Examples of the fluorine compound include propylene hexafluoride ($CF_2{=}CF{-}CF_3$), tetrafluoroethylene ($CF_2{=}CF_2$), perfluorobenzene ($C_6F_6$), and perfluorotoluene ($C_7F_8$). Additional examples of the silicon compound will be described below.

The water repellent glass formed according to the present invention has sufficient water repellency and soil resistance, is easily dried after washing and keeps clean after drying. In addition, the water repellent glass recovers its seethrough clarity soon after it gets wet. The water repellent film on the glass surface is durable and retains its water repellency for a long period of time due to its high adhesion strength.

According to the present invention, the water repellent film of the composite material may be formed by the plasma polymerization method. According to the plasma polymerization method, the respective raw material compounds for the adhesive component and the water repellent component are allowed to polymerize on the glass surface in an atmosphere of reduced pressure. The raw material compounds for plasma polymerization may be supplied individually one after another or all together with their composition continuously varied. In the former case, the adhesive component and water repellent component are obtained as two adjacent layers, and in the latter case, a water repellent film is obtained in which the amounts of the two components vary continuously across the thickness thereof. The plasma polymerization method is advantageous in that no harmful gas is generated and the removal of solvent is not necessary in the process. Moreover, it does not impair the quality of the glass.

When the composite material of the present invention is a surface-modified plastic, the single or multiple surface layer formed on the plastic substrate has a structure in which the inner side contains a comparatively large amount of the adhesive component and the outer side contains a comparatively large amount of the protective component. The protective component is a polymer of at least one nitrogen compound or silicon compound. The surface modified plastic is formed by coating a plastic sheet or film with a surface layer having an inner side and outer side which have different chemical compositions, wettability and other physical properties.

The surface layer on the plastic substrate exhibits three preferred embodiments as in the above-mentioned water repellent glass. Specifically, the amounts of the adhesive component and protective component may vary continuously across the thickness of the surface layer or the adhesion layer and the protective layer may be formed individually.

In the case of a surface modified plastic, the surface modifying film is formed by plasma polymerization in the presence of a non-polymerizing gas. Plasma polymerization is performed by supplying at least one carbon compound and at least one silicon compound or nitrogen compound to the reaction chamber, with the amounts of the compounds being changed with time. The surface modifying film may have a structure in which the chemical composition therein varies continuously or stepwise across the thickness thereof. The change of the composition depends on the method of supplying the raw material compounds.

Examples of the raw material compounds for the surface modifying film are given below. The carbon compounds include ethylene, acetylene, propylene, butadiene, benzene, toluene, zylene, ethylbenzene, and styrene. The nitrogen compounds include acetonitrile, acrylonitrile, aniline, pyridine, and vinylpyridine. With these compounds, the surface will have a contact angle to water of not more than 60° and thus have a hydrophilic property. The silicon compounds include tetramethylsilane, trimethylmethoxysilane, dimethyldimethoxysilane, trimethoxymethylsilane, tetramethoxysilane, ethoxytrimethylsilane, diethoxydimethylsilane, triethoxymethylsilane, tetraethoxysilane, vinyltrimethylsilane, vinyltrimethoxysilane, vinyltriethoxysilane, vinyltricholorosilane, vinyltriacetoxysilane, tetravinylsilane, hexamethyldisiloxane, hexamethylcyclotrisiloxane, octamethylcyclothetrasiloxane, and tetrapropoxysilane. With these compounds, the resultant surface will have a contact angle to water of not less than 90°. These silicon compounds may be used as the raw material for the surface layer of the water repellent glass.

According to the present invention, the plasma polymerization of the above-mentioned raw material compound should be performed in the presence of a non-polymerizing gas such as oxygen, nitrogen, argon, ammonia, or water vapor. The non-polymerizing gas alone does not form any polymer product by plasma when introduced into the reactor. It is considered, however, that upon excitation by plasma, the non-polymerizing gas reacts with the plastic in the reactor to form active sites on the plastic surface. It is also considered that the above-mentioned compounds containing an unsaturated carbon bond react with the excited non-polymerizing gas to form a polymerization product which firmly bonds to the plastic surface. This inference was made from conventional surface treatment of plastics with plasma which is performed to improve the wettability and adhesion of the plastics surface.

The plasma polymerization of a nitrogen compound or silicon compound in the presence of a non-polymerizing gas causes a C—N bond or a Si—O bond to be introduced into the surface modifying film. The incorporation of such a bond improves the scratch resistance and transparency of the surface modifying film. This effect is pronounced in the case where the plasma polymerization of a carbon compound, a nitrogen compound, or a silicon compound is performed particularly in the presence of oxygen.

The plastics substrate on which the surface modifying film is to be formed according to the present invention is not specifically limited. The plastics substrate may include, for example, polystyrene resin, polyvinyl chloride resin, polyolefin resins (such as polyethylene and polypropylene), polyacrylic or polymethacrylic resin, ionomer, polycarbonate, epoxy resin, and unsaturated polyester resin. These plastics substrates may be used in the form of a sheet, film, or other molded item.

If a surface modified plastic with outstanding water repellency and adhesion is to be obtained, it is desirable to produce the surface modifying film from a compound having a chemical composition identical to or similar to that of the plastic substrate. If the substrate is polystyrene resin, for example, styrene alone or a styrene-rich composition should be supplied to the reactor in the initial stage of plasma polymerization, and subsequently a silicon compound should be supplied for plasma polymerization. As mentioned above, the plasma polymerization is performed in the presence of a non-polymerizing gas. This sequence of raw material supply ensures the adhesion of the surface film to the substrate and improves the water repellence and scratch resistance of the surface layer. The surface modifying film thus formed is not easily peeled off from the plastic substrate.

According to the present invention, it is possible to produce a transparent surface modified plastic if a transparent plastic substrate is used and the surface modifying film is produced in a proper thickness from a proper raw material. When the surface modifying film is thinner than 1 μm, it has good transparency but poor mechanical strength. Thus the film thickness should be greater than 1 μm where scratch resistance is required.

According to the present invention, the conditions for plasma polymerization are not specifically limited. Those which have been used in the industry can generally be used. The thickness of the surface modifying film can be properly adjusted by changing the polymerization time.

According to the present invention, pretreatment of the plastic substrate is not necessary and solvents are not required for modification. Unlike the conventional wet process, the process of this invention does not limit the type of plastics that can be treated.

According to the present invention, it is possible to obtain transparent surface modified plastics which are superior in water resistance, adhesion, scratch resistance, and chemical resistance by properly selecting the kind and amount of raw material compound for plasma polymerization. The surface modification achieved according to the present invention permits inexpensive general-purpose plastics to be used in many applications that require high performance.

DESCRIPTION OF THE PREFERRED EMBODIMENTS

The invention will now be described in more detail with reference to the following examples.

EXAMPLE 1

Figure 4:
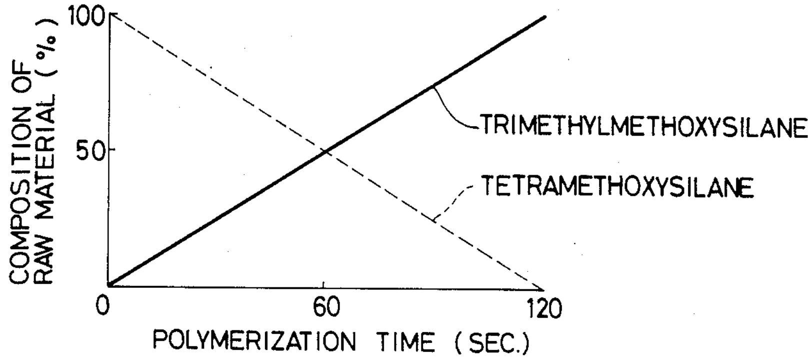
FIG. 4 is a graphical representation of the conditions for plasma polymerization employed in the production of the composite material of Example 1.

A composite material or water repellent glass as shown in FIG. 1 was prepared by performing plasma polymerization on a glass slide. A mixture of tetramethoxysilane and trimethylmethoxysilane was fed to a bell-jar reactor in which a glass slide was placed. The composition of the mixture was changed continuously with time as shown in FIG. 4. The conditions of plasma polymerization were as follows: Pressure: 0.1 Torr, input: 100 W, and frequency: 13.56 MHz. The water repellent film formed on the glass slide had a structure in which the amount of the polymer of tetramethoxysilane continuously decreased and the amount of the polymer of trimethylmethoxysilane continuously increased across the thickness of the film from the inner side toward the outer side.

The resulting water repellent glass was examined for water repellency by measuring the contact angle of distilled water placed on the surface. The contact angle of the treated glass was greater than 90°, whereas that of untreated glass was 10°.

The water repellent glass of this example was transparent, and it recovered see-through clarity immediately after being dipped in water. A small amount of water remaining on the surface could be easily wiped off with paper. In the case of untreated glass, it took some time until see-through clarity was recovered.

The water repellent film was examined for durability by a peel test with an adhesive tape. The water repellent film passed the peel test.

EXAMPLE 2

Figure 5:
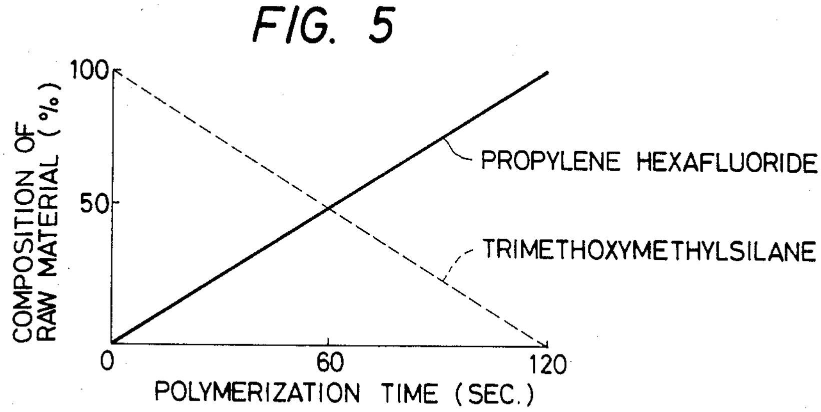
FIG. 5 is a graphical representation of the conditions for plasma polymerization employed in the production of the composite material of Example 2.

Plasma polymerization was performed in the same manner as in Example 1 except that a composition of trimethoxymethylsilane and propylene hexafluoride was changed continuously as shown in FIG. 5. The resulting water repellent film had a structure in which the amount of the polymer of trimethoxymethylsilane continuously decreased and the amount of the polymer of propylene hexafluoride continuously increased across the thickness of the film from the inner side toward the outer side. The water repellent film was examined as in Example 1. The contact angle was 95°, and the film passed the peel test.

EXAMPLE 3

Figure 6:
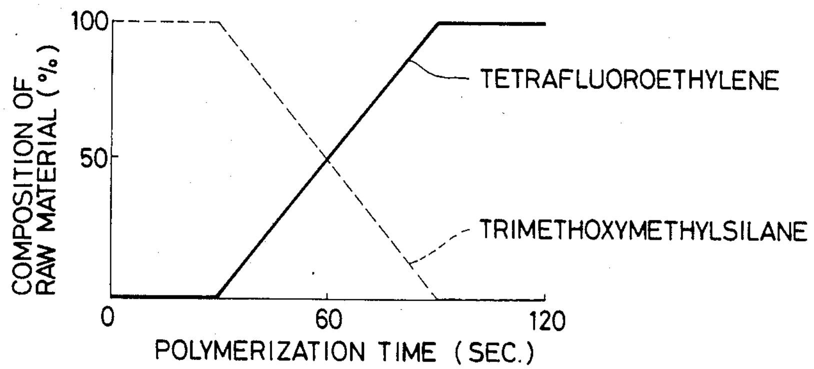
FIG. 6 is a graphical representation of the conditions for plasma polymerization employed in the production of the composite material of Example 3.

Plasma polymerization was performed in the same manner as in Example 1 except that a composition of trimethoxymethylsilane and tetrafluoroethylene was changed continuously as shown in FIG. 6. The resulting water repellent film was composed of three layers: an inner layer of the polymer of trimethoxymethylsilane outer layer of the polymer of tetrafluoroethylene, and an intermediate layer between the inner layer and the outer layer. The intermediate layer had a structure in which the amount of the polymer of trimethoxymethylsilane continuously decreased and the amount of the polymer of tetrafluoroethylene continously increased across the thickness of the intermediate layer from the inner side toward the outer side. The water repellent film was examined as in Example 1. The contact angle was 100°, and the film passed the peel test.

EXAMPLE 4

Plasma polymerization was performed in the same manner as in Example 1 except that tetramethoxysilane was supplied first and subsequently tetraethoxysilane was supplied. Thus the resulting water repellent film was composed of two layers as shown in FIG. 3. Specifically, the film was composed of an inner layer of the polymer of tetramethoxysilane (adhesive component) and an outer layer of the polymer of tetraethoxysilane (water repellent component). The water repellent film was examined as in Example 1. The contact angle was greater than 90°, and the film passed the peel test.

EXAMPLE 5

Figure 7:
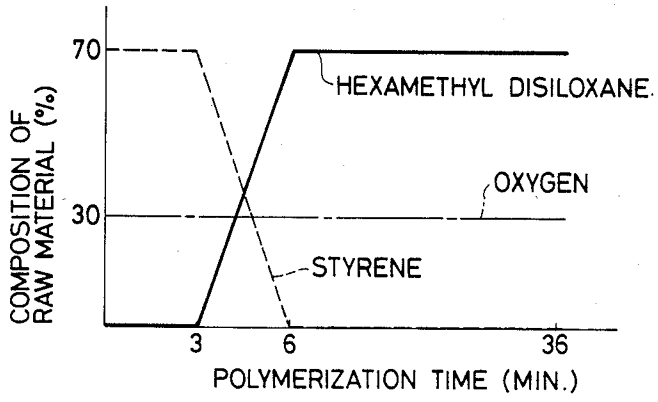
FIG. 7 is a graphical representation of the conditions for plasma polymerization employed in the production of the composite material of Example 5.

A composite material or surface treated plastic was prepared by performing plasma polymerization on a 5 mm thick polystyrene plate. At first, a mixture of styrene and oxygen was fed to a bell-jar reactor in which a polystyrene plate was placed. The conditions of plasma polymerization were as follows: pressure: 0.1 Torr, input: 100 W, and frequency: 13.56 MHz. Three minutes after the start of plasma polymerization, styrene was gradually replaced with hexamethyldisiloxane as shown in FIG. 7. Plasma polymerization was continued for 36 minutes.

The surface modifying film formed on the polystyrene plate passed the peel test with an adhesive tape (cellophane tape). The contact angle of distilled water on the modifying film was 90°, whereas that of an untreated polystyrene substrate was 85°.

The surface modifying film on the polystyrene plate was examined for scratch resistance by using a scratch tester with a sapphire stylus under a load of 3 to 5 g. The film exhibited good scratch resistance. The surface modifying film was transparent and 1 μm thick.

EXAMPLE 6

A surface modifying film was formed by plasma polymerization on a polycarbonate plate using the same raw materials as in Example 5. The film was transparent and 1 μm thick and passed the peel test with an adhesive tape. This surface treatment imparted water repellency and scratch resistance to the polycarbonate plate.

EXAMPLE 7

Figure 8:
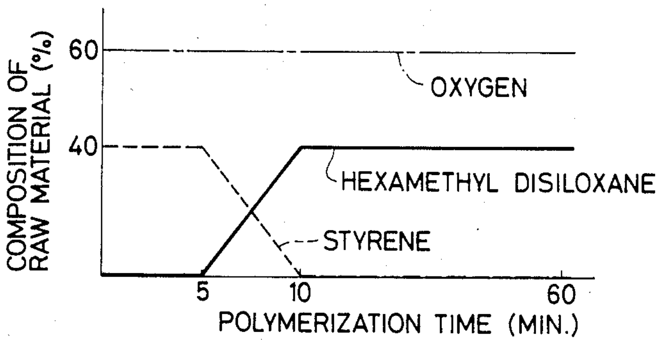
FIG. 8 is a graphical representation of the conditions for plasma polymerization employed in the production of the composite material of Example 7.

A surface modifying film was formed by plasma polymerization on a polystyrene plate in the same manner as in Example 5 except that the composition of the raw materials was changed with time as shown in FIG. 8. The surface modifying film was transparent and 1 μm thick and had superior water resistance and adhesion to the substrate.

EXAMPLE 8

A surface modified polystyrene plate was produced in the same manner and using the same raw materials as in Example 7 except that oxygen gas was replaced with nitrogen as the non-polymerizing gas. The resulting surface modifying film was transparent and had good water resistance, adhesion, and scratch resistance.

EXAMPLE 9

Figure 9:
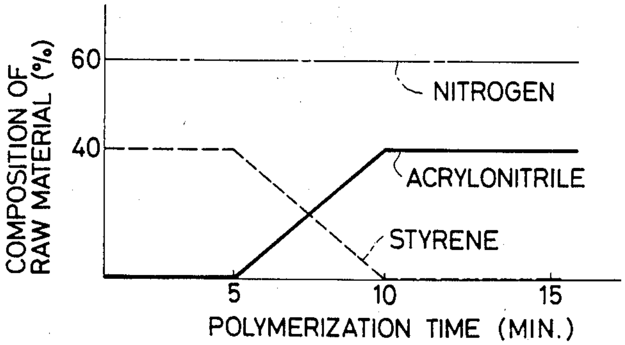
FIG. 9 is a graphical representation of the conditions for plasma polymerization employed in the production of the composite material of Example 9.

A surface modified polystyrene plate was produced in the same manner as in Example 8 except that hexamethyldisiloxane was replaced with acrylonitrile. The composition of raw materials for plasma polymerization was changed continuously as shown in FIG. 9.

The contact angle of water on the surface modifying film was 60°, and the adhesion of the surface modifying film was good.

While the present invention has been described in detail and with reference to specific examples thereof, it will be apparent to one skilled in the art that various changes and modifications can be made without departing from the spirit and scope thereof.

What is claimed is:

1. A composite material comprising a substrate and at least a single surface layer formed thereon, said surface layer comprising an adhesive component and a protective component, said surface layer having a structure wherein a first side in contact with said substrate contains a larger amount of said adhesive component than a second side of said surface layer, and said second side of said surface layer contains a larger amount of said protective component than said first side of said surface layer, said adhesive component being a polymer formed by plasma polymerization and having an adhesive property, and said protective component being a polymer formed by plasma polymerization and having a hydrophobic or hydrophilic property.

2. A composite material as set forth in claim 1, wherein the amount of said adhesive component and the amount of said protective component vary continuously across the thickness of said surface layer.

3. A composite material as set forth in claim 1, wherein said first side of said surface layer comprises said adhesive component but not said protective component, and said second side of said surface layer comprises said protective component but not said adhesive component, and wherein the amount of said adhesive component and the amount of said protective component vary continuously across the thickness of an intermediate part located between said first side and said second side.

4. A composite material as set forth in claim 1, wherein said surface layer comprises a first layer in contact with said substrate and a second layer being opposite said substrate, said first layer comprises an adhesion layer comprising said adhesive component but not said protective component and said second layer comprises a protective layer comprising said protective component but not said adhesive component, and the two components vary at a boundary between the two layers.

5. A composite material as set forth in claim 1, wherein said substrate is glass.

6. A composite material as set forth in claim 5, wherein the surface layer has a contact angle with water of not less than 90°.

7. A composite material as set forth in claim 5, wherein said adhesive component is a polymer formed of a first silicon compound and said protective component is a polymer formed of a second silicon compound containing more carbon or less oxygen than said first silicon compound.

8. A composite material as set forth in claim 7, wherein said first and second silicon compounds are independently selected from the group consisting of tetramethylsilane, trimethylmethoxysilane, dimethyldimethoxysilane, trimethoxymethylsilane, tetramethoxysilane, ethoxytrimethylsilane, diethoxydimethylsilane, triethoxymethylsilane, tetraethoxysilane, vinyltrimethylsilane, vinyltrimethoxysilane, vinyltriethoxysilane, vinyltriethoxysilane, vinyltriacetoxysilane, tetravinylsilane, hexamethyldisiloxane, hexamethylcyclotrisiloxane, octamethylcyclotetrasiloxane and tetrapropoxysilane.

9. A composite material as set forth in claim 5, wherein said adhesive component is a polymer formed of a silicon compound and said protective component is a polymer formed of a fluorine compound.

10. A composite material as set forth in claim 9, wherein said fluorine compound is selected from the group consisting of propylene hexafluoride, tetrafluoroethylene, perfluorobenzene and perfluorotoluene.

11. A composite material as set forth in claim 9, wherein the silicon compound is trimethoxymethylsilane and the fluorine compound is tetrafluoroethylene, and the surface layer has a contact angle with water of 100°.

12. A composite material as set forth in claim 9 wherein said silicon compound is selected from the group consisting of tetramethylsilane, trimethylmethoxysilane, dimethyldimethoxysilane, trimethoxymethylsilane, tetramethoxysilane, ethoxytrimethylsilane, diethoxydimethylsilane, triethoxymethylsilane, tetraethoxysilane, vinyltrimethylsilane, vinyltrimethoxysilane, vinyltriethoxysilane, vinyltrichlorosilane, vinyltriacetoxysilane, tetravinylsilane, hexamethyldisiloxane, hexamethylcyclotrisiloxane, octamethylcyclotetrasiloxane and tetrapropoxysilane.

13. A composite material as set forth in claim 1 wherein said substrate is plastics.

14. A composite material as set forth in claim 13, wherein said plastics substrate is selected from the group consisting of polystyrene resin, polyvinylchloride resin, polyethylene resin, polymethacrylate resin, ionomer, polycarbonate, epoxy resin and unsaturated polyester.

15. A composite material as set forth in claim 13, wherein said surface layer has a contact angle with water of not more than 60°.

16. A composite material as set forth in claim 13, wherein said surface layer has a contact angle with water of not less than 90°.

17. A composite material as set forth in claim 13, wherein said adhesive component is a polymer formed of a carbon compound and said protective component is a polymer formed of a nitrogen compound.

18. A composite material as set forth in claim 17, wherein said carbon compound is selected from the group consisting of ethylene, acetylene, propylene, butadiene, benzene, toluene, xylene, ethylbenzene, and styrene.

19. A composite material as set forth in claim 17, wherein said nitrogen compound is selected from the group consisting of acetonitrile, acrylonitrile, aniline, pyridine, and vinylpyridine.

20. A composite material as set forth in claim 17, wherein the adhesive component is formed of styrene and nitrogen and the protective component is formed of acrylonitrile and nitrogen, and the surface layer has a contact angle with water of 60°.

21. A composite material as set forth in claim 13, wherein said adhesive component is a polymer formed of a carbon compound and said protective component is a polymer formed of a silicon compound.

22. A composite material as set forth in claim 21, wherein the carbon compound is styrene and the silicon compound is hexamethyldisiloxane, and the surface layer has a contact angle with water of 90°.

23. A composite material as set forth in claim 21, wherein said silicon compound is selected from the group consisting of tetramethylsilane, trimethylmethoxysilane, dimethyldimethoxysilane, trimethoxymethylsilane, tetramethoxysilane, ethoxytrimethylsilane, diethoxydimethylsilane, triethoxymethylsilane, tetraethoxysilane, vinyltrimethysilane, vinyltrimethoxysilane, vinyltriethoxysilane, vinyltrichlorosilane, vinytriacetoxysilane, tetravinylsilane, hexamethyldisiloxane, hexamethylcyclotrisiloxane, octamethylcyclotetrasiloxane and tetrapropoxysilane.

24. A composite material as set forth in claim 21, wherein said carbon compound is selected from the group consisting of ethylene, acetylene, propylene, butadiene, benzene, toluene, xylene, ethylbenzene, and styrene.

25. A process for producing a composite material, comprising supplying a plasma reactor containing a substrate therein with a first raw material which forms an adhesive component upon plasma polymerization, continuously switching said first raw material to a second raw material which forms a protective component, whereby a composite material is produced, said composite material comprising a substrate and at least a single surface layer formed thereon, said surface layer having a structure wherein a first side contains a larger amount of said adhesive component than a second side of said surface layer, and said second side contains a larger amount of said protective component than said first side of said surface layer.

26. A process for producing a composite material as set forth in claim 25, wherein said substrate is plastics and said plasma polymerization is performed in the presence of a non-polymerizing gas.

27. A process for producing a composite material as set forth in claim 26, wherein said non-polymerizing gas is selected from the group consisting of oxygen, nitrogen, argon, ammonia, water vapor, and a mixture thereof.

* * * * *